(12) United States Patent
Jiang et al.

(10) Patent No.: US 7,179,310 B2
(45) Date of Patent: *Feb. 20, 2007

(54) ZINC/AIR CELL WITH IMPROVED ANODE

(75) Inventors: Zhiping Jiang, Westford, MA (US); George Cintra, Holliston, MA (US)

(73) Assignee: The Gillette Company, Boston, MA (US)

( * ) Notice: Subject to any disclaimer, the term of this patent is extended or adjusted under 35 U.S.C. 154(b) by 599 days.

This patent is subject to a terminal disclaimer.

(21) Appl. No.: 10/613,681

(22) Filed: Jul. 3, 2003

(65) Prior Publication Data

US 2005/0003271 A1    Jan. 6, 2005

(51) Int. Cl.
*H01M 4/42* (2006.01)
*H01M 4/62* (2006.01)
*H01M 4/26* (2006.01)

(52) U.S. Cl. ............... 29/623.5; 429/229; 429/122; 429/206; 429/207

(58) Field of Classification Search ........... 429/122, 429/229, 206–207; 29/623.1, 623.5
See application file for complete search history.

(56) References Cited

U.S. PATENT DOCUMENTS

| | | | |
|---|---|---|---|
| 2,960,558 A | 11/1960 | Marsal | |
| 2,993,947 A | 7/1961 | Leger | |
| 3,075,032 A | 1/1963 | Andre | |
| 3,669,754 A | 6/1972 | Ralston | |
| 3,784,406 A * | 1/1974 | Kosta et al. ............... 427/115 | |
| 3,884,721 A | 5/1975 | Tucholski | |
| 4,195,120 A | 3/1980 | Rossler | |
| 5,401,590 A * | 3/1995 | Chalilpoyil et al. ........... 429/59 |
| 5,518,838 A | 5/1996 | Bai | |
| 5,538,813 A * | 7/1996 | Li ............................... 429/317 |
| 6,300,011 B1 * | 10/2001 | Lin et al. .................... 429/229 |

FOREIGN PATENT DOCUMENTS

| | | |
|---|---|---|
| DE | 3416728 | 11/1985 |
| EP | 0768723 A | 4/1997 |
| JP | SHO 48-12690 | 4/1973 |
| JP | KOHOKU 54-31576 | 10/1979 |
| JP | 55-108172 A | 8/1980 |
| JP | KOHOKU 55-30260 | 8/1980 |
| JP | 56-116270 A | 9/1981 |
| JP | 5611270 A * | 9/1981 |
| JP | KOKAI 56-116270 | 9/1981 |
| JP | 57-158949 A | 9/1982 |
| WO | WO 00/36676 A | 6/2000 |

* cited by examiner

*Primary Examiner*—Dah Wei Yuan
*Assistant Examiner*—Karie O'Neill
(74) *Attorney, Agent, or Firm*—Barry D. Josephs; Thomas G. Krivulka

(57) ABSTRACT

A method of forming an anode comprising zinc for a zinc/air cell. The method involves mixing zinc particles with binders including preferably polyvinylalcohol, surfactant and water to form a wet paste. The wet paste is compacted and molded into the near shape of the cell's anode cavity and then heated to evaporate water. A solid porous zinc mass is formed wherein the zinc particles are held bound within a network with microscopic void spaces between the zinc particles. The solid mass can be inserted into the cell's anode cavity and aqueous alkaline electrolyte, preferably comprising potassium hydroxide, then added. The solid mass absorbs the aqueous electrolyte and expands to fill the anode cavity to form the final fresh anode.

15 Claims, 4 Drawing Sheets

ZINC/AIR CELL WITH IMPROVED ANODE

FIELD OF THE INVENTION

This invention relates to zinc anode for a zinc/air cell. The invention relates to an anode prepared by preforming a solid porous mass comprising zinc particles to which aqueous alkaline electrolyte is added to form the final anode.

BACKGROUND OF THE INVENTION

A zinc/air cell is a type of metal/air cell depolarized with air. Zinc/air cells can also be considered as a type of alkaline cell, since aqueous alkaline electrolyte is normally added to the zinc anode. Zinc/air cells are typically in the form of button cells which have particular utility as batteries for electronic hearing aids including programmable type hearing aids. Such miniature cells typically have a disk-like cylindrical shape of diameter between about 4 and 12 mm and a height between about 2 and 6 mm. Zinc air cells can also be produced in somewhat larger sizes having a cylindrical casing of size comparable to conventional AAAA, AAA, AA, C and D size $Zn/MnO_2$ alkaline cells and even larger sizes.

The miniature zinc/air button cell typically comprises an anode casing (anode cup), and a cathode casing (cathode cup). The anode casing and cathode casing each can have a closed end and an open end. An electrical insulating material can be placed around the outside surface of the anode casing. After the necessary materials are inserted into the anode and cathode casings, the open end of the anode casing is typically inserted into the open end of the cathode casing and the cell sealed by crimping. The anode casing can be filled with a mixture comprising particulate zinc. The anode mixture for zinc/air cells, normally contains zinc particles amalgamated with mercury (typically the mercury is about 3 percent by weight of the anode). The anode mixture also contains a gelling agent and becomes gelled when electrolyte is added to the mixture. The electrolyte is usually an aqueous solution of potassium hydroxide, however, other aqueous alkaline electrolytes can be used.

The cathode casing (cathode cup) contains an air diffuser (air filter) which lines the inside surface of the cathode casing's closed end. The air diffuser can be selected from a variety of air permeable materials including paper and porous polymeric material. The air diffuser is placed adjacent to air holes in the surface of the closed end of the cathode casing. Catalytic material typically comprising a mixture of particulate manganese dioxide, conductive carbon and hydrophobic binder can be inserted into the cathode casing over the air diffuser on the side of the air diffuser not contacting the air holes. The manganese dioxide used in the cathode is preferably electrolytic manganese dioxide (EMD) which is made by direct electrolysis of a bath of manganese sulfate and sulfuric acid. The EMD is desirable since it has a high density and high purity. An electrically conductive carbon material is typically added to the cathode mixture to improve the electric conductivity between individual manganese dioxide particles. Such electrically conductive additive also improves electric conductivity between the manganese dioxide particles and the cell housing, which also serves as cathode current collector. Suitable electrically conductive additives can include, for example, conductive carbon powders, such as carbon blacks, including acetylene blacks, flaky crystalline natural graphite, flaky crystalline synthetic graphite, including expanded or exfoliated graphite. An ion permeable separator is typically applied over the catalytic material so that it faces the open end of the cathode casing.

The cathode casing can typically be of nickel plated cold rolled steel or nickel clad stainless steel with the nickel layer preferably on both inner and outer surfaces of the cold rolled or stainless steel. The anode casing can also be of nickel plated stainless steel, typically with the nickel plate forming the casing's outside surface. The anode casing can be of a triclad material composed of stainless steel having an outer layer of nickel and an inner layer of copper. An insulator ring of a durable, polymeric material can be inserted over the outside surface of the anode casing. The insulator ring is typically of high density polyethylene, polypropylene or nylon which resists flow (cold flow) when squeezed.

After the anode casing is filled with the zinc mixture and after the air diffuser, catalyst, and ion permeable separator is placed into the cathode casing, the open end of the anode casing can be inserted into the open end of the cathode casing. The peripheral edge of the cathode casing can then be crimped over the peripheral edge of the anode casing to form a tightly sealed cell. The insulator ring around the anode casing prevents electrical contact between the anode and cathode cups. A removable tab is placed over the air holes on the surface of the cathode casing. Before use, the tab is removed to expose the air holes allowing air to ingress and activate the cell. A portion of the closed end of the anode casing can function as the cell's negative terminal and a portion of the closed end of the cathode casing can function as the cell's positive terminal.

Typically, mercury is added in amount of at least one percent by weight, for example, about 3 percent by weight of the zinc in the anode mix. The mercury is added to the anode mix to reduce the hydrogen gassing which can occur as a side reaction in the zinc/air cell during discharge and when the cell is placed in storage before or after discharge. The mercury, for example, reduces the rate of the zinc corrosion side reaction involving reaction of zinc with water producing zinc oxide and hydrogen gas. The gassing, if excessive, can reduce the cell capacity (mAmp-hrs) and increase the chance of electrolyte leakage. Such leakage can damage or destroy the hearing aid or other electronic component being powered. The mercury also improves electrical conductivity between the zinc particles. Many regions around the world now restrict the use of mercury in electrochemical cells because of environmental concerns. Although mercury has generally been eliminated from conventional zinc/$MnO_2$ alkaline cells, it is still employed in many zinc/air button cells because such cells are usually very small and thus contain only very small total amount of mercury. However, in view of increasing regulation against use of mercury, it is desirable to reduce or eliminate added mercury from zinc/air button cells as well.

Zinc anodes for zinc/air cells may be prepared in the form of a slurry which is pumped into the cell's anode cavity with the aid of a slurry pump. The slurry may comprise a gelled mixture of amalgamated zinc particles, gelling agent such as polyacrylic acid, and aqueous alkaline electrolyte solution. However, it is usually desired to have a high zinc content for the zinc/air cell anode, for example, between about 75 to 80 percent or higher. In such case the anode mixture can becomes too heavy for pumping. Instead the anode is typically prepared by dispensing a mixture of amalgamated zinc particles and gelling agent into cell's anode cavity and the adding aqueous alkaline electrolyte to form the gelled anode. In commercial production this becomes an inefficient and speed limited method of forming the anode for zinc/air cells. It can also lead to nonuniform dispersion of zinc particles within the gelled anode. Also, some settling or precipitation of zinc particles within the gelled anode can occur, for example, in cases where the cells are stored for long time or experience some shock or vibration.

If the zinc content is reduced, a pumpable anode slurry can be prepared. The anode slurry can be prepared by forming a gelled electrolyte mixture comprising an aqueous alkaline electrolyte, preferably a gelled aqueous potassium hydroxide. Such gelled electrolyte can be formed, for example, by mixing a gelling agent such as a polyacrylic acid gelling agent with aqueous alkaline electrolyte. A dry zinc powder, typically amalgamated with mercury, is then mixed into the gelled electrolyte to form an anode slurry mixture. The anode slurry mixture is conventionally pumped into the zinc/air cell's anode cavity by a slurry pump. Although the slurry pump is designed to keep air from entering the slurry mixture, the pump nevertheless typically allows small amounts of air to enter the slurry as it is pumped into the cell's anode cavity. This causes small air pockets to develop within the anode mixture pumped into the cell's anode cavity. Such air pockets can be microscopic in size but more typically there are a number of such air pockets which are visible to the naked eye when the anode is examined by simple X-ray photography without magnification. Optionally some additional aqueous electrolyte may be added to adjust the electrolyte composition in the anode mixture after the slurry is pumped into the anode cavity. However, such additional electrolyte does not noticeably reduce the number of air pockets within the anode slurry. The presence of such air pockets within the anode slurry tends to reduce the overall conductivity of the anode because it reduces the level of zinc interparticle contact in the region of the air pockets.

In a commercial cell assembly line such zinc slurry tends to plug the dispensing tube, leading to down time of the assembly line. Also, the storage of large batches of the slurry tends to result in settling or precipitation of some of the zinc particles over time, which can result ultimately in a nonuniform distribution of zinc particles. The zinc particle settling or precipitation could also occur from the gelled zinc slurry already dispensed into the cells, for example, in cases where the cells are stored for long time or experience some shock or vibration. Such precipitation of the zinc particles will cause non-uniform distribution of the zinc within the anode cavity and subsequent loss of electrical continuity. Also pumping the anode slurry into very small dimensioned, particularly, small irregular shaped anode cavities becomes difficult. In such case the slurry mixture must be prepared with more attention given to zinc particle shape and slurry flowability (consistency) which can compromise the final anode from the standpoint of overall conductivity.

It is desirable to eliminate the need for either dispensing an anode slurry into the anode cavity or alternatively dispensing a mixture of zinc particles and gelling agent into the anode cavity and then adding aqueous electrolyte. Rather, it is desired to prepare the anode in preformed solid form which can be inserted as a dry solid into the anode cavity without the need of pumping a slurry mixture into the anode cavity. Thus, it is desired to eliminate the need for pumping the anode mixture into the anode cavity with a slurry pump or other pumping device.

SUMMARY OF THE INVENTION

The invention is directed to a method of forming an anode comprising zinc for an alkaline cell such as zinc/$MnO_2$ alkaline cells and zinc/air cells. The method of forming the anode of the invention is suitable for preparing zinc anodes for alkaline cells, and has particular application to primary (nonrechargeable) alkaline cells and zinc/air cell. Alkaline cells including zinc/air cells typically have an anode comprising particulate zinc, a cathode comprising manganese dioxide and aqueous alkaline electrolyte, preferably comprising potassium hydroxide. The method of the invention may also be used to prepare anodes comprising particulate zinc in alkaline cells having cathodes other than manganese dioxide, provided such cells employ aqueous alkaline electrolyte, for example, comprising aqueous potassium hydroxide. The method of the invention can be used in preparing zinc anodes for alkaline cells regardless of the cells overall shape. For example, the cell may be a cylindrical cell, button cell or flat cell, provided the cell employs aqueous alkaline electrolyte. The anode of the invention can be used regardless of the shape of the alkaline cell or zinc/air cell anode cavity. For example, the anode of the invention is suitable for use in an irregularly shaped anode cavity such as that disclosed in U.S. Pat. No. 6,482,543 B1.

In a particular application the method of the invention can be also used in preparing zinc anodes which are suitable for use in zinc/air cells. Such cells typically employ an anode comprising particulate zinc and aqueous alkaline electrolyte, usually comprising potassium hydroxide. Such zinc/air cells are commonly employed in the form of button cells used, for example, in hearing aids. Zinc/air cells may also be in the form of elongated cylindrical cells. The Zinc/air cell has an anode comprising zinc and typically has a cathode assembly comprising manganese dioxide. The zinc is depolarized with incoming air which in effect functions electrochemically as the cathode. The manganese dioxide included within the cathode assembly, typically acts as a cathode catalyst but may also function in part as active cathode material which undergoes useful electrochemical reaction during cell discharge.

An aspect of the invention is directed to preparing an aqueous wet zinc paste and molding the paste in the approximate shape of the anode cavity for the alkaline cell or zinc/air cell. This can be done conveniently by applying the wet paste into a steel, ceramic or plastic die having a cavity therein in the approximate shape of the cell's anode cavity. The paste fills the cavity under pressure and thereby assumes the cavity shape. The paste can be pressure-molded in the die cavity under ambient temperatures for a short time, typically 2–3 seconds. The paste molded in this manner forms a wet zinc mass (wet preform) which is readily removable from the die. The wet zinc mass (wet preform) has sufficient structural integrity so that it can stand alone outside of the die while retaining its molded shape. The stand alone wet preform is then heated to evaporate water, thereby resulting in a solid, dried, porous zinc mass (solid preform) which can be stored until the cell is ready for assembly.

The wet zinc mass (wet paste) is formed as follows: A mixture of zinc particles, surfactant, hydrogel binders, polyvinylalcohol binder and water is blended into a paste using an electric/mechanical blender until the paste has a homogeneous consistency. The amount of binders and water in the blend are adjusted to control the paste consistency. Alkaline electrolyte is not added to the wet paste. The wet paste is then inserted into a cavity within a steel, ceramic, or plastic die. The die cavity has the approximate shape of the cell's anode cavity, but preferably slightly smaller. The wet paste can have a consistency much like a wet cement and thus can be conveniently extruded into the die cavity. The wet paste can be pressure-molded in the die cavity for a short period, typically about 2–3 seconds under ambient temperatures, so that it becomes compacted and fully assumes the shape of the cavity. For example, the wet paste can be filled into a die cavity having the approximate shape of the desired anode cavity. The outlet end of the die cavity may abut a detachable solid base. A first stroke of a plunger can be used to compact the wet paste within the die cavity to form the compacted wet zinc mass (wet premold). The die base can be removed and a second stroke of the plunger forces the wet zinc mass (wet premold) out from the die cavity (die mold). The binders in the wet zinc mass, particularly the polyvinylalcohol, helps to impart sufficient structural integrity to the wet mass so that it is dimensionally stabilized. The polyvinylalcohol functions as glue which holds the zinc particles together. The wet mass is dimensionally stabilized, that is, retains at least its general overall shape and can stand alone, outside of the die. The term "dimensionally stabilized" of course also extends to and includes a wet mass which completely retains the shape it obtained when formed in the mold when it is thereafter removed from the mold. Other methods of shaping the wet paste can be employed, for example, the wet paste can be inserted into an open die mold; pressure can be applied to the surface of wet paste in the mold to compact the wet paste therein to form the compacted wet zinc mass. The die mold could then be inverted to release the compacted mass. The wet zinc mass emanating from the die cavity or mold is preferably in the near shape of the anode cavity that it will be inserted into.

The wet paste forming the wet zinc mass (wet preform) preferably comprises a mixture of zinc particles, surfactant, hydrogel binders, polyvinylalcohol binder and water. The surfactant is preferably a dinonyl phenol phosphate ester surfactant such as that available commercially under the tradename "RM-510" from Rhone-Poulenc. The binders comprise a) one or more hydrogel binders which can be in the form of commercially available gelling agents and b) a polyvinylalcohol binder. A preferred hydrogel binder is a crosslinked acrylic acid polymer gelling agent available commercially under the tradename "CARBOPOL C940" from B.F. Goodrich. The CABOPOL C940 binder may be employed alone. Preferably, however, another hydrogel, such as a hydrolyzed polyacrylonitrile grafted onto a starch backbone commercially available under the tradename "Waterlock A-221" from Grain Processing Co. may be added to form the total hydrogel binder. In the case of a zinc/air cell anode instead of Waterlock A-221 hydrogel, the superabsorbent Waterlock J-550 hydrogel (Grain Processing Co.) may be employed. Waterlock J-550 hydrogel is termed a sodium polyacrylate superabsorbent polymer and comprises sodium salts of polyacrylic acids. The polyvinylalcohol is added to provide structural integrity to the wet paste so that it may be molded.

The wet zinc mass (wet preform) removed from the die cavity may have the following composition: zinc (80 to 94 wt. %), surfactant, e.g. dinonyl phenol phosphate ester RM-510 surfactant (0.05 to 0.2 wt. %); total binders (0.5 to 3 wt. %) comprising for example, CARBOPOL C940 binder (0.5 to 3 wt. %) and WATERLOCK A-221 binder or WATERLOCK J-550 binder (0.05 to 0.33 wt. %) and polyvinylalcohol (0.2 to 1 wt. %); and water (3 to 18 wt. %). The polyvinylalcohol preferably has a molecular weight between about 85000 and 146000. Such polyvinylalcohol can be obtained commercially in solid form. It can conveniently be dissolved with water before adding it to the zinc particles. The wet zinc mass (wet perform) removed from the die cavity holds at least its general overall shape when placed on a flat surface. That is, it is dimensionally stabilized. Optionally, a separator material can be applied to or wrapped around at least a surface of the wet zinc mass (wet preform). The wet zinc mass may be dried by placing it in free standing form, with or without separator material applied thereto, in an oven exposed to ambient air. The wet zinc mass, with or without separator thereon, is heated desirably at a temperature between about 55° C. and 120° C., for example, at a temperature of about 55° C., to evaporate at least a portion of the water therein. It will be understood that the term dry or dried as used herein shall mean that the wet zinc mass is treated by heating and the like so that at least a portion of the free water therein is removed. Preferably, essentially all of the free water within the wet zinc mass is evaporated during the heating step thereby forming a dry, solid porous zinc mass (solid preform).

The solid porous zinc mass (solid preform) has the near shape of a cell's anode cavity. The zinc particles are held suspended in a tight network within the dry solid mass. The solid zinc mass (solid preform) may desirably have the following composition: zinc (96 to 99 wt. %); surfactant, e.g. dinonyl phenol phosphate ester RM-510 surfactant (0.06 to 0.25 wt. %); total binders (0.5 to 3 wt. %) comprising for example, CARBOPOL C940 binder (0.5 to 3 wt. %) and WATERLOCK A-221 binder or WATERLOCK J-550 binder (0.05 to 0.37 wt. %) and polyvinylalcohol (0.22 to 1.2 wt. %). The solid porous zinc mass (solid preform) may have a porosity typically between about 25 and 50 percent, preferably between about 40 and 50 percent. (The porosity is the volume of void spaces within the mass divided by the mass overall apparent volume.) The dry solid zinc mass (solid preform) is characterized by pockets of microscopic void spaces which appear between the individual zinc particles resulting in a porosity of the solid perform of between about 25 and 50 percent, typically between about 40 and 50 percent. These microscopic void spaces were formerly filled by the water which was evaporated from the wet zinc mass (wet preform). Surprisingly, the polyvinylalcohol functions as a glue to hold the zinc particles together in a solid porous zinc mass (solid preform). The polyvinylalcohol surprisingly provides sufficient structural integrity to prevent collapse of the solid porous zinc mass (solid preform) and assures that it retains its overall shape. The solid porous zinc mass is thus dimensionally stabilized, that is, retains at least its general overall shape in free standing form. The term "dimensionally stabilized" of course also extends to and includes a mass, for example, a solid porous zinc mass which completely retains its shape when standing alone. Thus, it can be kept in storage until ready for use in the cell. During cell assembly the solid preform can be inserted into the alkaline cell's or zinc/air cell's anode cavity. Then, aqueous alkaline electrolyte, preferably comprising potassium hydroxide, is added. The solid preform immediately absorbs the aqueous alkaline electrolyte whereupon the mass preferably expands to the full shape of the anode cavity thus forming the final fresh anode. The polyvinylalcohol functions as a glue which binds the zinc particles together in both the wet zinc mass (wet preform) and the dry solid porous zinc mass (solid preform). The hydrogel binders serve mainly as gelling agents, that is, they absorb aqueous electrolyte solution and also cause expansion of the solid preform when the electrolyte solution is added thereto. The polyvinylalcohol is stable and chemically resistant to alkaline electrolyte.

The method of the invention of inserting a solid (or dimensionally stabilized) porous zinc mass into the anode cavity of a zinc/air cell and then adding aqueous alkaline electrolyte thereto to form the anode thus eliminates the disadvantages associated with prior art methods of pumping a gelled anode slurry into the anode cavity or mixing discrete zinc particles, gelling agent and aqueous electrolyte within the anode cavity without first applying the solid porous zinc mass.

DETAILED DESCRIPTION

Figure 1:
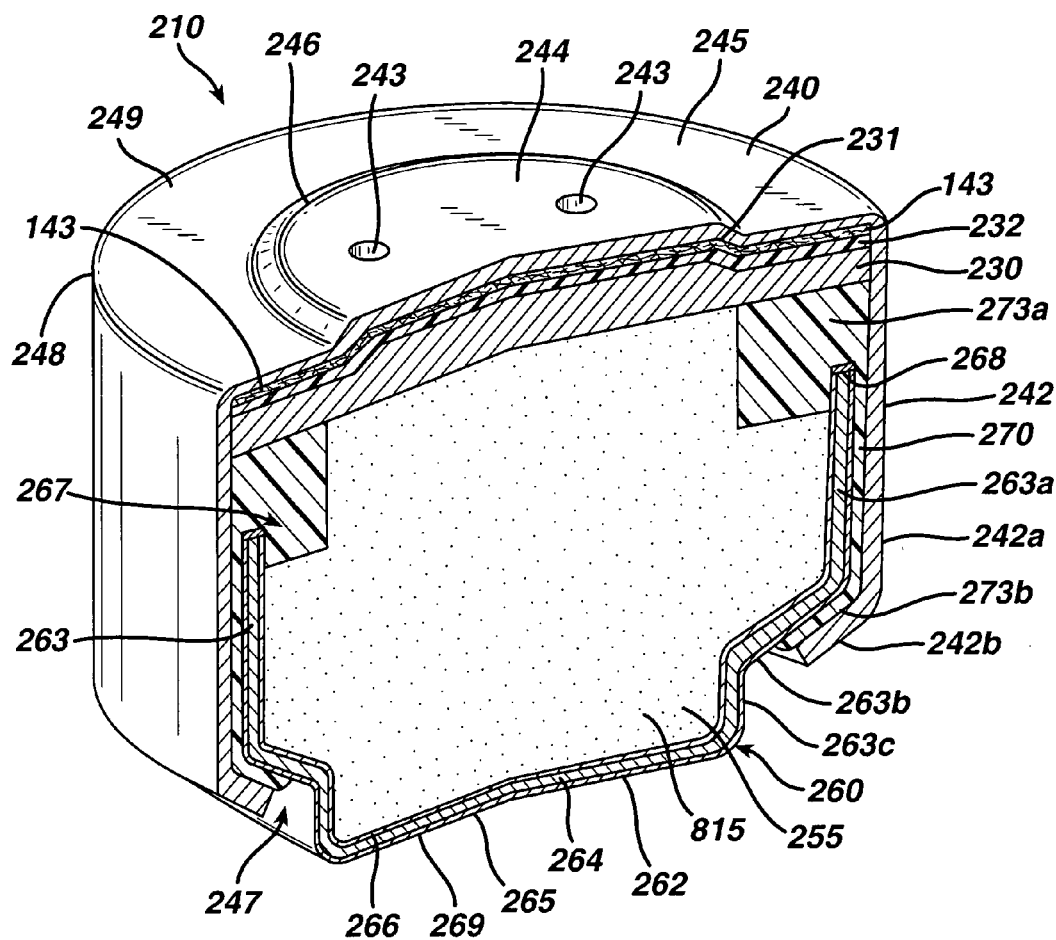
FIG. 1 is an isometric cross-sectional view of a zinc/air button cell having a zinc anode made by the method of the invention.

A representative zinc/air alkaline cell utilizing the anode mixture of the invention is shown in FIG. 1. Zinc/air cell 210 is a primary (nonrechargeable) cell. The zinc/air cell 210 comprises an anode casing 260 (anode cup) and a cathode casing 240 (cathode cup). The cathode casing 240 can typically be of nickel plated cold rolled steel or nickel clad stainless steel with the nickel layer preferably on both inner and outer surfaces of the cold rolled or stainless steel. The anode casing 260 can also be of nickel plated stainless steel, typically with the nickel plate forming the casing's outside surface.

A premolded dry solid porous zinc mass (solid preform) 815C (FIG. 3D) is prepared and inserted into the cell's anode cavity 255 within anode cup 260. The solid preform is porous having a porosity, between about 25 and 50 percent, typically between about 40 and 50 percent. The solid porous zinc mass (solid preform) 815C is preferably of a hard solid consistency and is dimensionally stabilized, that is, it retains sufficient structural integrity to maintain at least its general overall shape when free standing outside of the cell. In a preferred embodiment described herein the solid porous zinc mass 815C retains its shape completely when placed in a storage container or left free standing on a surface. The solid porous zinc mass (solid preform) 815C is preferably dry and can be stored until the time of cell assembly, since the constituents therein are unreactive in a dry environment. The solid zinc mass 815c is preformed into the shape of the anode cavity 255 but of somewhat smaller diameter so that it is readily insertable into the anode cavity 255 within anode cup 260. In a preferred embodiment the outside diameter of the solid preform 815C is selected to be between about 10 and 40 percent less than the inside diameter of the anode cavity 255 when initially inserted therein. A separator 238 can be wrapped or placed onto the solid preform 815C before the solid preform 815C is inserted into the anode cavity. After the preformed solid zinc mass (solid preform) 815C is inserted into anode cavity 255, aqueous alkaline electrolyte, preferably comprising aqueous potassium hydroxide, is added to the anode cavity 255. The aqueous electrolyte is absorbed by the solid porous zinc mass which expands to the diameter and full shape of the anode cavity thus forming the final fresh anode 815.

The zinc/air cell of the invention is desirably in the form of a miniature button cell. It has particular application as a power source for electronic hearing aids. The miniature zinc/air button cell of the invention typically has a disk-like cylindrical shape of diameter between about 4 and 16 mm, preferably between about 4 and 12 mm and a height between about 2 and 9 mm, preferably between about 2 and 6 mm. The miniature zinc/air cell typically has an operating load voltage between about 1.1 volt to 0.2 volt. The cell typically has a substantially flat discharge voltage profile between about 1.1 and about 0.9 volt whereupon the voltage can then fall fairly abruptly to zero. The miniature button cell can be discharged at a rate between about 0.2 and 20 milliAmp. The term "miniature cells" or "miniature button cells" as used herein is intended to include such small size button cells, but is not intended to be restricted thereto, since other shapes and sizes for small zinc/air cells are possible. For example, zinc air cells could also be produced in somewhat larger sizes having a cylindrical casing of size comparable to conventional AAAA, AAA, AA, C and D size $Zn/MnO_2$ alkaline cells, and even larger. The present invention is also intended to be applicable to such larger cell sizes and also to other cell shapes, for example, prismatic or elliptical shapes or cells having flat or curvilinear surfaces.

The cell of the invention can contain added mercury, for example, about 3 percent by weight of the zinc in the anode or can be essentially mercury free (zero added mercury cell). In such zero added mercury cells there is no added mercury and the only mercury present is in trace amounts naturally occurring with the zinc. Accordingly, the cell of the invention can have a total mercury content less than about 100 parts per million parts by weight of total zinc, preferably less than 50 parts per million of total zinc, more preferably less than about 20 parts per million parts of zinc. (The term "essentially mercury free" as used herein shall mean the cell has a mercury content less than about 100 parts by weight per million parts of total zinc.) The cell of the invention can have a very small amount of lead additive in the anode. If lead is added to the anode, the lead content in the cell can typically be between about 100 and 600 ppm of zinc content in the anode. However, the cell desirably does not contain added amounts of lead and thus can be essentially lead free, that is, the total lead content is less than 30 ppm, desirably less than 15 ppm of the total zinc content of the anode.

The zinc/air cell 210 of the invention (FIG. 1) has an anode casing 260, a cathode casing 240, and electrical insulator material 270 therebetween. The anode casing 260 has body 263, an integral closed end 269, and an open end 267. The cathode casing 240 has a body 242, an integral closed end 249 and an open end 247. The closed end 249 of the cathode casing (when the casing is held in vertical position with the closed end on top) typically has a raised portion 244 near its center. This raised portion 244 forms the positive terminal contact area and typically contains a plurality of air holes 243 therethrough. The cathode casing closed end 249 also typically has an annular recessed step 245 which extends from the peripheral edge 246 of the raised terminal portion to the outer peripheral edge 248.

The anode casing 260 contains fresh anode 815 comprising particulate zinc and alkaline electrolyte. As above described anode 815 is made by inserting the solid porous zinc mass 815C into anode cavity 255 and then adding aqueous electrolyte to the mass. The particulate zinc is desirably alloyed with indium between about 50 and 1000 ppm of the zinc, preferably between about 100 and 1000 ppm, desirably between about 200 and 500 ppm of the zinc.

The cathode casing 240 has a plurality of air holes 243 in the raised portion 244 of its surface at the closed end thereof. A cathode catalytic assembly 230 containing a catalytic composite material 234 (FIG. 2) is placed within the casing proximate to the air holes. During cell discharge, the catalytic material 234 facilitates the electrochemical reaction with ambient oxygen as it ingresses through air holes 243. An adhesive sealant 143 is applied along a portion of the inside surface of cathode casing 240. Desirably the adhesive can be applied as a continuous ring on the inside surface of recessed annular step 245 at the closed end 249 of the cathode casing as shown in FIG. 1. If the closed end of the cathode casing is flat, that is, does not have a recessed step 245, the adhesive sealant 143 can be applied to the inside surface of the closed end 249 adjacent the outer peripheral edge 248 of said closed end.

Figure 2:
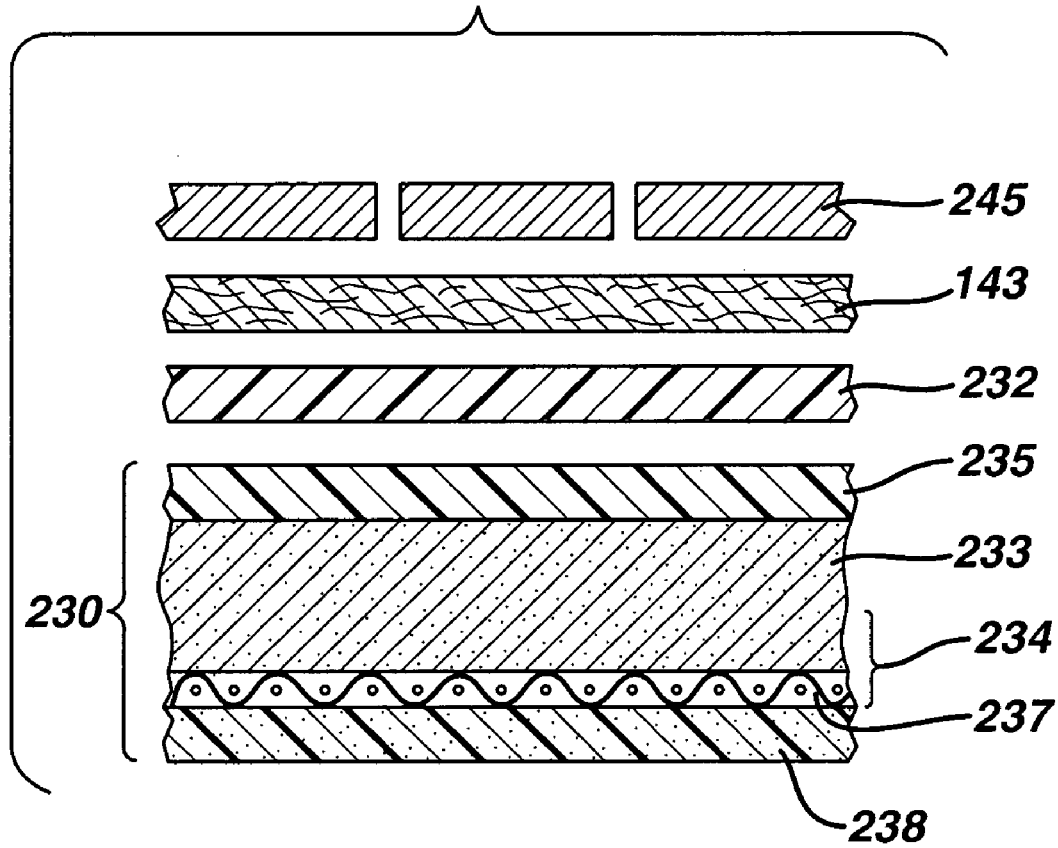
FIG. 2 is an exploded view of a preferred embodiment of the catalytic cathode assembly shown in FIG. 1.

A cathode catalytic assembly 230 (FIGS. 1 and 2) can be formed by laminating a layer of electrolyte barrier film material 235, preferably Teflon (tetrafluoroethylene), to one side of the catalytic composite material 234 and an ion permeable separator material 238 to the opposite side. Alternatively, separator 238 can be wrapped or placed on the solid porous zinc mass 815C before said porous zinc mass is inserted into the anode cavity 255. The electrolyte barrier film 235, preferably of Teflon, has the property that it is permeable to air, yet keeps water and electrolyte from passing therethrough. The edge of cathode catalytic assembly 230 can be applied to said adhesive ring 143 on step 245 thereby providing a permanent adhesive seal between the cathode composite 234 and casing step 245. In a specific embodiment the cathode catalytic assembly 230 can be applied to adhesive 143 on step 245 with the electrolyte barrier 235 contacting the adhesive. In a preferred embodiment a separate electrolyte barrier sheet 232, preferably of Teflon, can be applied to adhesive ring 143 on the inside surface of step 245, thereby bonding electrolyte barrier sheet 232 to the inside surface of step 245. The catalytic assembly 230 can then be applied over electrolyte barrier sheet 232, preferably with the surface of second electrolyte barrier sheet 235, preferably of Teflon, contacting the barrier sheet 232 (FIG. 2). The barrier sheet 232 when bonded to the inside surface of step 245, particularly in combination with a second barrier sheet 235 (FIG. 2) being applied against barrier sheet 232, provides a very effective seal preventing electrolyte from migrating around the edge of catalytic assembly 230 and gradually leaking out of air holes 243. The use of adhesive sealant 143 also reduces the amount of crimping force needed during crimping the outer peripheral edge 242b over the anode casing body. This is particularly advantageous when thin walled casings (thickness between about 0.002 inches (0.0508 mm) and 0.015 inches (0.38 mm), preferably between about 0.002 inches (0.0508 mm) and 0.006 inches (0.152 mm) and thin catalytic cathode assemblies 230 are employed, since high crimping forces could possibly distort or crack such thin casings and cathode assemblies.

A preferred embodiment of a zinc/air cell of the invention is shown in FIG. 1. The embodiment shown in FIG. 1 is in the form of a miniature button cell. The cell 210 comprises a cathode casing 240 (cathode cup) an anode casing 260 (anode cup) with an electrical insulator material 270 therebetween. The insulator 270 can desirably be in the form of a ring which can be inserted over the outside surface of the anode casing body 263 as shown in FIG. 1. Insulator ring 270 desirably has an enlarged portion 273a extending beyond peripheral edge 268 of the anode casing (FIG. 1). The insulator 270 with enlarged portion 273a prevents anode active material from contacting the cathode casing 240 after the cell is sealed. (Anode active material is defined herein as anode material which undergoes useful electrochemical reaction upon cell discharge.) Insulator 270 is of a durable electrically insulating material such as high density polyethylene, polypropylene or nylon which resists flow (resists cold flow) when squeezed.

Separator 238 can be of cellulosic film or a film formed of nonwoven material comprising polyvinylalcohol and rayon fibers. Separator 238 can be of a single layer of such nonwoven material or can be a composite having an outer layer of cellophane adhered to the nonwoven material. The nonwoven material can typically contain between about 60 weight percent to 80 weight percent polyvinylalcohol fibers and between about 20 and 40 weight percent rayon fibers. Separator 238 can be positioned so that the cellophane layer is adjacent to either cathode composite 234 or anode 815. The above described separators are known and have been used in connection with conventional alkaline cells and are also suitable for use in the present zinc/air cell 210.

The anode casing 260 (anode cup) and cathode casing 240 (cathode cup) are initially separate pieces. The anode casing 260 and cathode casing 240 are separately filled with active materials, whereupon the open end 267 of the anode casing 260 can be inserted into the open end 247 of cathode casing 240. The anode casing 260 is characterized by having a first straight body potion 263a of maximum diameter which extends vertically downwardly (FIG. 1) from peripheral edge 268 to a point which is more than at least 50% of the anode casing 260 height whereupon the casing is slanted inwardly to form slanted midportion 263b. There is a second straight portion 263c extending vertically downwardly from the terminal end of midportion 263b. The second straight portion 263c is of smaller diameter than straight portion 263a. The portion 263c terminates with a 90° bend forming the closed end 269 having a relatively flat negative terminal surface 265. The body 242 of cathode casing 240 has a straight portion 242a of maximum diameter extending vertically downwardly from closed end 249. The body 242 terminates in peripheral edge 242b. The peripheral edge 242b of cathode casing 240 and underlying peripheral edge 273b of insulator ring 270 are initially vertically straight and can be mechanically crimped over the slanted midportion 263b of the anode casing 260. This locks the cathode casing 240 in place over the anode casing 260 and forms a tightly sealed cell.

After the separator 238 is in place the solid porous zinc mass (solid preform) 815C of the invention can be inserted into the anode cavity 255. Aqueous alkaline electrolyte, preferably comprising potassium hydroxide, is then added to the anode cavity as above mentioned. The electrolyte is immediately absorbed by the solid porous zinc mass whereupon the mass expands and forms a final fresh homogeneous anode 815 in the full shape of anode cavity 255. The final fresh anode 815 is typically of a soft, wet, spongy consistency.

Zinc/air 210 is not intended to be restricted to any particular cathode chemistry, as long as the anode 815 is prepared by the method of the invention comprising a) forming a preformed dimensionally stabilized zinc mass, b) inserting the preformed mass into the cell's anode cavity 255, and c) adding aqueous electrolyte to the anode cavity to form a final fresh anode 815. Thus zinc/air cell 210 can be the form of a miniature button cell (FIG. 1) having a disk-like cylindrical shape of diameter between about 4 and 16 mm, preferably between about 4 and 12 mm and a height between about 2 and 9 mm, preferably between about 2 and 6 mm. The above cell (FIG. 1) can be in the size and shape of an AAAA, AAA, AA, C or D cylindrical cells. These standard cell sizes are recognized in the art and are set by the American National standards Association or in Europe by the International Electrotechnical Commission (IEC). For example, the AA cylindrical cell has standard overall dimensions as given by the American National Standards Institute (ANSI) battery specification ANSI C18.1M, Part 1–1999 as follows: The overall length from positive and negative terminal tips is between 49.2 mm and 50.5 mm and overall outside cell diameter is between 13.5 mm and 14.5 mm. The cell 210 may also be in the form of flat or prismatic shaped cells or cells having an outer casing with one or more flat or curvilinear surfaces.

The final fresh anode 815 preferably contains zero added mercury (less than 50 parts by weight mercury per million parts zinc, preferably less than 20 parts mercury per million parts total zinc in the anode). The cell 210 of the invention also preferably does not contain added amounts of lead and thus can be essentially lead free, that is, the total lead content is less than 30 ppm, desirably less than 15 ppm of zinc in the anode. The final fresh anode 815 desirably contains indium in amount between about 50 and 1000 ppm of the zinc, preferably between about 200 and 1000 ppm, desirably between about 200 and 500 ppm of the zinc.

The final fresh anode composition 815 (FIG. 1) comprises: Zinc alloy powder 62 to 82 wt %, preferably between about 70 and 78 wt % (99.9 wt % zinc containing indium in total amount between about 200 and 1000 ppm zinc, typically between about 200 and 500 ppm zinc), an aqueous KOH solution (21–26%) comprising 38 wt % KOH and about 2 wt % ZnO; a polyvinyl alcohol binder (between about 0.15 and 1.0 wt. %, preferably between about 0.2 and 0.8 wt. %); a hydrogel binder comprising a partially crosslinked acrylic acid polymer gelling agent available commercially under the tradename "CARBOPOL C940" from B.F. Goodrich (e.g., 0.25 to 2 wt %) and another hydrogel which, for example, may be a starch graft copolymer such as a starch graft copolymer of polyacrylic acid and polyacrylamide available under the tradename "Waterlock A-221" from Grain Processing Co. Or a sodium polyacrylate superabsorbent polymer hydrogel available under the tradename Waterlock J-550 from Grain Processing Co. (between 0.01 and 0.3 wt. %); dionyl phenol phosphate ester surfactant available commercially under the tradename "RM-510" from Rhone-Poulenc (between 0.025 and 0.15%). The zinc alloy, may typically contain between about 200 and 500 parts by weight indium per million parts zinc. Such zinc alloy have mean average particle size between about 30 and 1000 micron, desirably between about 30 and 400 micron, typically between about 100 and 400 micron. It will be understood that the particle size is based on the particles' long dimension in the case of irregularly shaped particles. The zinc particles may be spherical or predominantly spherical or alternatively may be predominantly of non spherical shape, for example, polygonal or acicular shape. It shall be understood that the term zinc as used herein shall include such zinc alloy powder, since the alloy powder is composed almost entirely of zinc and functions electrochemically as zinc.

Although the above binders, namely gelling agents CARBOPOL C940 and WATERLOCK A-221 or WATERLOCK J-550 hydrogels are preferred in conjunction with the polyvinylalcohol binder to form the anode mixture of the invention, other gelling agent binders may also be used in conjunction with the polyvinyalcohol. For example, the gelling agents for the zinc slurry can be selected from a variety of known gelling agents. Preferred gelling agents are substantially insoluble in the cell electrolyte so that the gelling agent does not migrate between the anode and cathode. The preferred gelling agents also do not lose water when the final anode of the invention is left in storage. Suitable gelling agents which may be used as binders in conjunction with the polyvinylalcohol binder for the anode mixture of the invention, for example, may be carboxymethyl cellulose or crosslinked carboxymethyl cellulose, methyl cellulose, crosslinked polyacrylamides, partially crosslinked acrylic acid polymers such as CARBOPOL C-940 from B.F. Goodrich Co., starch graft copolymers such as WATER-LOCK A-221 starch-graft copolymer of polyacrylic acid and polyacrylamide from Grain Processing Co., sodium polyacrylate superabsorbent polymer WATER-LOCK J-550 and alkali hydrolyzed polyacrylonitrile such as WATER-LOCK A-400 from Grain Processing Co. Although any of these gelling agents can be employed alone or in combination, at least one of the gelling agents may advantageously be selected from partially crosslinked acrylic acid polymer such as CARBOPOL C940 or SIGMA POLYGEL 4P gelling agents.

In the preferred embodiment a polyvinylalcohol, preferably of M.W. between about 85000 and 146000, is added as described in the above to form the wet anode paste 815*a*. The wet anode paste is compacted to form a free standing (dimensionally stabilized) wet zinc mass 815*b* which can be dried and converted into the dry solid porous zinc mass 815*c* (dry solid premold) of the invention. The dry solid porous mass 815*c* in turn can be inserted into the anode cavity 255 of an alkaline or zinc/air cell. Aqueous alkaline electrolyte, preferably comprising potassium hydroxide is then added to the solid porous zinc mass whereupon the electrolyte is absorbed in the solid mass causing the mass to expand and convert into the final anode 815. The polyvinylalcohol binder as well as the acrylic acid polymer CARBOPOL C940 binder are chemically very stable in alkaline electrolyte and are desirable binders particularly when employed in combination for the anode of the present invention. The polyvinylalcohol functions as a gluing agent for the zinc particles and in particular provides added structural integrity and holds the zinc particles together is a tight network so that the free standing (dimensionally stabilized) solid porous mass (solid preform) may be formed.

Figure 3A:
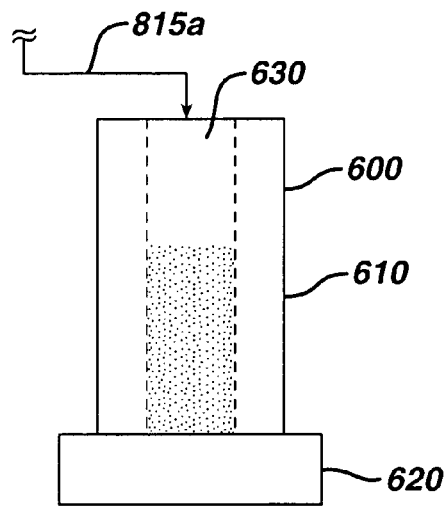
FIG. 3A is a drawing showing a die cavity being filled with a wet zinc paste of the invention.
Figure 3B:
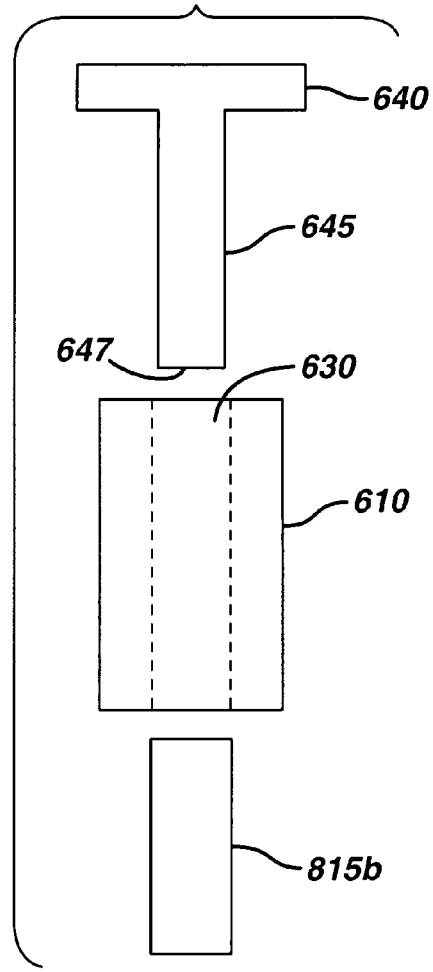
FIG. 3B is a schematic showing a resulting wet zinc mass after the wet zinc paste has been compacted within the die cavity.

In accordance with the invention a wet zinc paste 815*a* is first prepared and molded to form a wet preform mass 815*b* in the near shape of anode cavity 255. This can be done conveniently by pouring or extruding the wet paste 815*a* into die cavity 630 of steel or plastic die 600 as shown in FIG. 3A. Die 600 has a body portion 610 with cavity 630 running therethrough. The die body sits on detachable base 620 (FIG. 3A). Die cavity 630 is in the approximate shape of the cell's anode cavity. The wet zinc paste 815*a* is molded under pressure by applying a pressure to the plunger top 640 thereby injecting plunger 645 into die cavity 630, for example, in 2–3 seconds, causing the wet zinc paste 815*a* to become compacted and molded into the cavity 630 shape. Typically, a moderate force can be applied to the plunger, desirably under about 400 pounds force, typically between about 10 and 300 pounds. Such force is applied in this manner to the exposed surface of the wet zinc paste 815*a* by a stroke of plunger 645, for die cavities 630 having diameter, for example, between about 3 and 7 mm. The amount of force is adjusted depending on the diameter or width of the die cavity 630 and the amount of the wet zinc paste present within the die. Smaller diameter cavities and smaller amount of the wet zinc paste require less plunger force than larger diameter cavities and larger amount of the wet zinc paste. Die base 620 is then detached from the die body 610. The molded wet zinc mass (wet preform) 815b can be pushed through the die cavity 630 by a second stroke of plunger 645 (shown in retracted position in FIG. 3B). The wet preform 815b (FIG. 3B) emanating from die cavity 630 (FIG. 3B) is dimensionally stabilized, that is, has sufficiently strong structural integrity so that it can stand alone outside of the die while retaining at least its general molded shape.

Figure 3C:
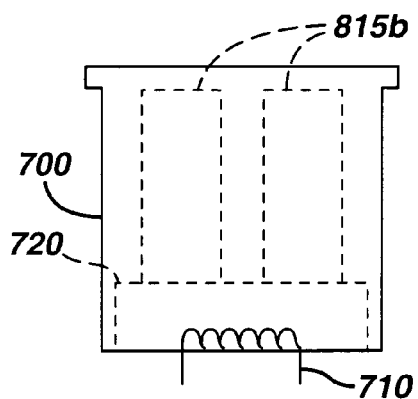
FIG. 3C is a schematic showing the compacted wet zinc mass being dried in an oven to produce a dry solid porous zinc mass.
Figure 3D:
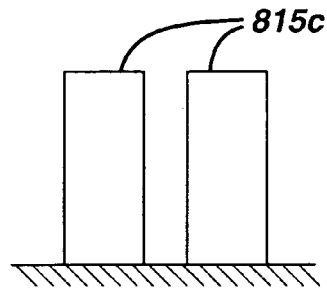
FIG. 3D is schematic showing the dry solid porous zinc mass product.

Thus, the wet zinc mass 815b (wet preform) in a preferred embodiment can be placed on a flat tray or surface 720 which can be inserted in an oven 700 (FIG. 3C). Oven 700 can be a conventional oven heated by an electric or gas source 710. The wet preform 815b is then heated in an oven 700 at elevated temperature, preferably between about 55° C. and 120° C., for example about 55° C., in ambient air (or inert gas), to evaporate at least a portion of the free water therein, thereby resulting in a dry porous zinc mass (solid preform) 815C. The dry zinc mass 815C (FIG. 3D) is dimensionally stable, typically a solid porous zinc mass, and thus can stand alone without change in at least its general shape. It can be stored in sealed containers until time for cell assembly. The porous zinc mass 815C (solid preform) is then inserted into the cell's anode cavity 255 and aqueous electrolyte added thereby expanding the zinc mass to form the final fresh anode 815.

Optionally, separator 238 can be applied to at least an exposed surface of wet zinc mass 815b. The separator 238 will typically adhere to the wet zinc mass 815b. The wet zinc mass 815b with separator 238 thereon is placed in an oven 700. Upon drying a solid porous zinc mass 815c is formed with separator 238 adhered thereto. The solid zinc mass 815c can then be inserted into the anode cavity 255 with separator facing cathode composite 234. Separator 238 may be of electrolyte permeable material conventionally employed in alkaline cells. Having the separator 238 applied to the wet zinc mass 815b avoids the need of attaching said separator to the cathode composite 234.

The wet zinc paste 815a inserted into die cavity 630 is formed as follows: A mixture of zinc particles, surfactant, hydrogel binders, polyvinylalcohol binder and water is blended into a paste using an electric/mechanical blender for a period of time, typically about 2–3 minutes, until the paste has a homogeneous consistency. The amount of binders and water in the blend are adjusted to control the paste consistency. The wet paste is then inserted into a steel, ceramic or plastic die having a die cavity 630 (FIG. 3A) in the approximate shape of the anode cavity, but preferably slightly smaller. For example, the diameter of die cavity 630 may typically be between about 10 and 40 percent smaller than the inside diameter of anode cavity 255. The wet paste assumes the shape of the die under pressure in about 2–3 seconds. The wet paste is then removed in its entirety from the die and is now in the form of a wet zinc mass (wet preform) in the near shape of the anode cavity. The binders in the wet mass, particularly the polyvinylalcohol, impart sufficient structural integrity to the mass so that the molded wet preform can stand alone outside of the die.

The wet paste forming the wet zinc mass (wet preform) comprises a mixture of zinc particles, surfactant, hydrogel binders, polyvinylalcohol binder and water. The wet paste is formed without adding aqueous electrolyte. The surfactant is preferably a dinonyl phenol phosphate ester surfactant such as that available commercially under the tradename "RM-510" from Rhone-Poulenc. The binders comprises a) one or more hydrogel binders (gelling agents) and b) a polyvinylalcohol binder. A preferred hydrogel binder is a cross-linked acrylic acid polymer gelling agent available commercially under the tradename "CARBOPOL C940" from B.F. Goodrich. The CABOPOL C940 binder may be employed alone. Preferably, however, a hydrolyzed polyacrylonitrile grafted onto a starch backbone commercially available commercially under the tradename "Waterlock A-221" from Grain Processing Co or a sodium polyacrylate superabsorbent polymer available as "Waterlock J-550" superabsorber from Grain Processing Co. is added to form the total hydrogel binder. The hydrogel binders function more as binders in the wet preform, since the wet preform does not include alkaline electrolyte. (The hydrogel become gelling agents in the presence of alkaline electrolyte.) The wet preform 815b may have the following composition: zinc (80 to 94 wt. %), surfactant, e.g. dionyl phenol phosphate ester RM-510 surfactant (0.05 to 0.2 wt. %); total binders (0.5 to 3 wt. %) comprising for example, CARBOPOL C940 binder (0.5 to 3 wt. %) and WATERLOCK A-221 binder or WATERLOCK J-550 binder (0.05 to 0.33 wt. %) and polyvinylalcohol (0.2 to 1 wt. %); and water (3 to 18 wt. %).

Figure 4:
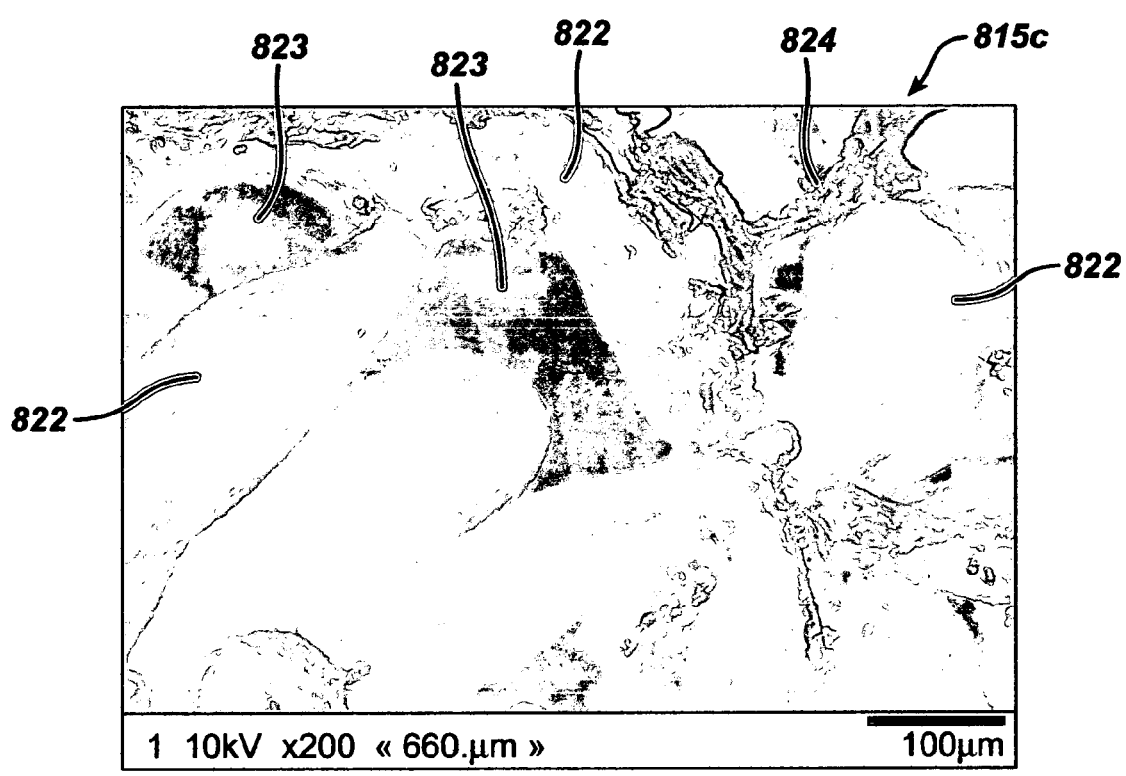
FIG. 4 is a scanning electron micrograph showing the void spaces between zinc particles after water has been evaporated to form the solid porous zinc mass referenced in FIG. 3D.

The wet perform 815b is heated in an oven at temperature desirably between about 55° C. and 1200 ° C., preferably at about 55° C., for a period of about 2 to 3 hours or less in ambient air (or inert gas). Such heating evaporates at least a portion of the water in the wet preform thereby forming a solid, porous zinc mass (solid preform) 815C in the near shape of the anode cavity. It is desirable to keep the heating temperature below about 120° C. to avoid degradation of the polyvinylalcohol and/or gelling agents within the wet preform 815b. The solid porous zinc mass (solid preform) 815C is desirably at least substantially or relatively dry. The solid preform 815C may desirably have the following composition: zinc (96 to 99 wt. %); surfactant, e.g. dionyl phenol phosphate ester RM-510 surfactant (0.03 to 0.25 wt. %); total binders (0.5 to 3.3 wt. %) comprising for example, CARBOPOL C940 binder (0.5 to 3.3 wt. %) and WATERLOCK A-221 binder or WATERLOCK J-550 binder (0.05 to 0.37 wt. %) and polyvinylalcohol (0.22 to 1.2 wt. %). The mean average zinc particle size may be between about 30 and 1000 micron, typically between about 100 and 400 micron. The solid porous zinc mass (solid preform) may be stored for very long periods, essentially for many months or even years, since there is no component therein which will react with each other or with the zinc particles. The solid preform may be stored in air under ambient conditions, since exposure to air does not cause noticeable deterioration of the zinc particles or other components within the dry preform. The solid porous zinc mass (solid preform) 815C is characterized by pockets of microscopic void spaces which appear between the individual zinc particles resulting in a porosity of the solid perform of between about 25 and 50 percent, typically between about 40 and 50 percent. Such microscopic void spaces 823 between zinc particles 822 are clearly seen in the scanning electron micrograph of the solid porous zinc mass 815C shown in FIG. 4. These void spaces were formerly filled by the water which was evaporated from the mass. The binder material 824 such as polyvinylalcohol is shown in FIG. 4 between the zinc particles 822 and holds the zinc particles 822 together in a solid porous mass. Surprisingly, the polyvinylalcohol, preferably at molecular weight between about 85000 and 146000, functions as a glue to hold the zinc particles together in the solid porous zinc mass (solid preform). The polyvinylalcohol imparts structural integrity to prevent collapse of the solid preform after formation as well as during storage. The solid perform can be placed in storage for long periods, for example, many months or even years before it is desired to insert it into the cell's anode cavity.

When it is desired to load the cell 210 with anode material, the solid porous zinc mass (solid preform) is inserted in the cell's anode cavity 255. Alkaline electrolyte, preferably an aqueous solution of potassium hydroxide, is then added to the anode cavity. Desirably the aqueous alkaline electrolyte comprising potassium hydroxide (concentration between about 35 and 40 wt. % KOH, 2 wt. % ZnO) is added to the anode cavity in amount so that the weight ratio of aqueous electrolyte to the solid porous zinc mass (solid preform) is between about 0.25 and 0.75. The aqueous alkaline electrolyte becomes absorbed into the solid preform causing the preform to expand and tightly fill the anode cavity. The addition of the aqueous alkaline electrolyte also activates the gelling characteristics of the hydrogel binders. The zinc particles become held together in a tighter network than in conventional zinc slurry anodes and there are no visible air pockets within the final anode when the anode is viewed in normal size by X-ray photography. The tighter network of zinc particles tends to improve conductivity and overall performance of the anode. The polyvinylalcohol functions as a glue which binds the zinc particles together, whereas the hydrogel binders serve mainly as a gelling agents, that is, they absorb aqueous electrolyte solution and also cause expansion of the dry zinc mass when the electrolyte is added thereto.

A catalytic cathode assembly 230 (FIGS. 1 and 2) and air diffuser 231 can be inserted into casing 240 as follows: An air diffuser disk 231 (FIG. 1), which can be in the form of an air porous filter paper or porous polymeric material can be inserted into the cathode casing 240 so that lies against the inside surface of the raised portion 244 of the casing against air holes 243. An adhesive sealant ring 143, preferably comprising a polyamide adhesive, is applied to the inside surface of recessed step 245 at the closed end of the cathode casing. A separate electrolyte barrier layer 232 (FIGS. 1 and 2), for example, of polytetrafluroethylene (Teflon) can optionally be inserted over the air diffuser 231 so that the edge of the barrier layer 232 contacts adhesive ring 143. Barrier layer 232 is permeable to air but not permeable to the alkaline electrolyte or water. The adhesive ring 143 thus permanently bonds the edge of barrier layer 232 to the inside surface of recessed step 245. The adhesive ring 143 with barrier layer 232 bonded thereto prevents electrolyte from migrating from the anode to and around cathode catalytic assembly 230 and then leaking from the cell through air holes 243. A catalytic cathode assembly 230 as shown in FIG. 2 can be prepared as a laminate comprising a layer of electrolyte barrier material 235, a layer of cathode catalyst composite 234 under the barrier layer 235 and a layer of ion permeable separator material 238 under the catalyst composite 234, as shown in FIG. 2. The separator 238 can be selected from conventional ion permeable separator materials including cellophane, polyvinylchloride, acrylonitrile, and microporous polypropylene. Each of these layers can be separately prepared and laminated together by application of heat and pressure to form the catalytic assembly 230. The electrolyte barrier layer 235 can desirably be of polytetrafluroethylene (Teflon). The catalytic assembly 230 can then be applied over electrolyte barrier sheet 232 (FIG. 2), preferably with the surface of barrier (Teflon) sheet 235 contacting the barrier sheet 232.

Catalytic cathode composite 234 desirably comprises a catalytic cathode mixture 233 of particulate manganese dioxide, carbon, and hydrophobic binder which is applied by conventional coating methods to a surface of an electrically conductive sheet or screen 237, preferably a nickel mesh screen. Other catalytic materials may be included or employed such as metals like silver, platinum, palladium, and ruthenium or other oxides of metals or manganese ($MnO_x$) and other components known to catalyze the oxygen reduction reaction. During application the catalytic mixture 233 is substantially absorbed into the porous mesh of screen 237. The manganese dioxide used in the catalytic mixture 233 can be conventional battery grade manganese dioxide, for example, electrolytic manganese dioxide (EMD). The manganese dioxide in catalytic mixture 233 can also be manganese dioxide formed from the thermal decomposition of manganese nitrate $Mn(No_3)_2$. The carbon used in preparation of mixture 233 can be in various forms including graphite, carbon black and acetylene black. A preferred carbon is carbon black because of its high surface area. A suitable hydrophobic binder can be polytetrafluoroethylene (Teflon). The catalytic mixture 233 may typically comprise between about 3 and 10 percent by weight $MnO_2$, 10 and 20 percent by weight carbon, and remainder binder. During cell discharge the catalytic mixture 233 acts primarily as a catalyst to facilitate the electrochemical reaction involving the incoming air. However, additional manganese dioxide can be added to the catalyst and the cell can be converted to an air assisted zinc/air or air assisted alkaline cell. In such cell, which can be in the form of a button cell, at least a portion of manganese dioxide becomes discharged, that is, some manganese is reduced during electrochemical discharge along with incoming oxygen. The adhesive ring 143 and method of application herein described is intended to be applicable for use as well in such air assisted cells to prevent leakage of electrolyte therefrom.

After the air diffuser 231 and catalytic assembly 230 are inserted into casing 240 with either barrier layer 235 or alternatively barrier layer 232 adhered to adhesive ring 143, the solid porous zinc mass 815C of the invention is inserted into the anode cavity 255 of anode cup 260. Aqueous alkaline electrolyte, preferably comprising potassium hydroxide, is then added to the anode cavity 255 whereupon it is absorbed by the mass 815C. The mass 815C expands to fill the anode cavity and thereby form the final fresh anode 815. The open end 267 of the filled anode casing 260 can be inserted into the open end 247 of cathode casing 240. The peripheral edge 242b of the cathode casing can be crimped over the slanted midportion 263b of the anode casing with insulator 270 therebetween, as above described.

In the preferred embodiment (FIG. 1) the anode casing 260 has a layer of copper 266 plated or clad on its inside surface so that in the assembled cell the anode 815 contacts the copper layer. The copper plate is desired because it provides a highly conductive pathway for electrons passing from the anode 815 to the negative terminal 265 as the zinc is discharged. The anode casing 260 is desirably formed of stainless steel which is plated on the inside surface with a layer of copper. Preferably, anode casing 260 is formed of a triclad material composed of stainless steel 264 with a copper layer 266 on its inside surface and a nickel layer 262 on its outside surface as shown in FIG. 1. Thus, in the assembled cell 210 the copper layer 266 forms the anode casing inside surface in contact with anode 815 and the nickel layer 262 forms the anode casing's outside surface.

The copper layer 266 desirably has a thickness between about 0.0002 inches (0.005 mm) and 0.002 inches (0.05 mm). The stainless steel typically has a thickness between about 0.001 inches (0.0254 mm) and 0.01 inches (0.254 mm) and the nickel layer between about 0.0001 inches (0.00254 mm) and 0.001 inches (0.0254 mm). The total wall thickness of the anode casing 260 composed of the triclad material can be desirably between about 0.002 inches (0.0508 mm) and 0.015 inches (0.38 mm), preferably between about 0.002 inches (0.0508 mm) and 0.006 inches (0.152 mm).

A comparative zinc/air button cell 210 of size 675 (11 mm diameter by 5 mm thickness) was prepared employing conventional MnO2 catalytic cathode, separator and. The anode for the comparative cell was prepared from a conventional zinc mixture wherein free zinc particles, gelling agent and aqueous electrolyte were blended within the anode cavity 255 of anode cup 260. Test cells 210 of same 675 size (11 mm diameter by 5 mm thickness) were then prepared. The cathode and separator of the test cells were the same as that used in the comparative cell. The separator 238 in each case was a conventional ion porous separator consisting of an inner layer of a nonwoven material of cellulosic (rayon) and polyvinylalcohol fibers and an outer layer of cellophane. However, the anode 815 in the test cells was prepared in accordance with the method of the invention in which a wet zinc mass 815c (wet preform) was molded into the near shape of the anode cavity. The wet preform was then dried to form a solid porous zinc mass 815C (solid preform) as above described. The solid perform was inserted into anode cavity 255. Aqueous alkaline electrolyte was added to the anode cavity and absorbed by the solid preform to form the final anode 815. The comparative and test button cells each had about the same amount of zinc. The performance of the cells, service life (milliamp-hrs) and energy output (milliwatt-hrs) was determined by discharging at constant current drains of 8 milliAmp and 16 milliAmp to cut off voltage of 0.5 volts.

EXAMPLE 1

Comparative Test—Zinc/Air Cell: Conventional Anode Mixture/Conventional MnO2 Cathode Test size 675 (11 mm×5 mm) button cells 210 of the general configuration shown in FIG. 1 were prepared. The cathode composition in the same size comparative and test cells, for example, may have the following representative composition between about 3 and 10 percent by weight $MnO_2$, 10 and 20 percent by weight carbon, and remainder binder. A specific cathode composition for the same size 675 comparative and test button cells used for the performance tests reported in Table 1 and Table 2 was as follows: The catalytic cathode composite 234 had the following overall composition: $MnO_2$ 4.6 wt. %, carbon black 15.3 wt. %, Teflon binder 18.8 wt. %, with nickel plated steel sheet 238, 61.2 wt. %.

The anode of the comparative zinc/air test cell 210 was prepared in conventional manner by blending a mixture of free zinc particles (amalgamated with 3 wt. % mercury), gelling agent and added aqueous alkaline electrolyte within the anode cavity 255 of anode cup 260. The anode mixture which filled the anode cavity 255 of the comparative cell formed anode 815 having 0.77 grams zinc alloy. The final anode 815 had the following composition: 77.9 wt % of zinc alloy powder (The zinc alloy contained 3 wt. % mercury; there was no indium added), 21.8 wt % of an aqueous KOH solution comprising 38 wt % KOH and about 2 wt % ZnO; 0.23 wt % of a gelling agent which is a sodium salt of polyacrylic acid termed sodium polyacrylate superabsorbent polymer available commercially under the tradename "Waterlock J-550" from Grain Processing Co. The zinc alloy mean average particle size was between about 200 and 350 micron. The separator 238 was a conventional dual layered cellulosic separator employing an outer layer comprising rayon and polyvinylalcohol (facing cathode 234) and inner layer of cellophane facing anode 815.

Fresh zinc/air button cells of Example 1 were discharged at a constant rate of 8 milliAmp (low rate). In separate tests batches of fresh zinc/air cells 210 of Example 1 were discharged at a constant rate of 16 milliAmp (high rate).

At discharge of 8 milliAmp (low rate), the capacity obtained at a cut off voltage of 0.5 Volts was 520 milliAmp-hrs (694 milliAmp-hrs per gram pure zinc). The average voltage at 50% capacity was 1.19 Volt.

At discharge of 16 milliAmp, the capacity obtained at a cut off voltage of 0.5 Volts was 510 milliAmp-hrs (681 millAmp-hrs per gram pure zinc). The average voltage at 50% capacity was 1.10 Volt.

A cell gassing test was conducted by measuring the amount of gas generated from the zinc anode when the fresh zinc anode was placed in a sealed bag and stored at 60° C. for 4 weeks. The amount of gassing was 0.63 ml gas per gram of anode.

EXAMPLE 2

Zinc/Air Cell: Anode from Solid Porous Zinc Mass of the Invention/Conventional MnO2 Cathode Test size 675 (11 mm×5 mm) button cells 210 were prepared as in Example 1 except that the anode 815 was formed from the wet zinc mass (wet preform) which was molded into the approximate shape of the anode cavity 255 and then dried to produce the solid porous zinc mass (solid preform) 815C of the invention. The solid porous zinc mass 815C was inserted into the anode cavity 255 and then aqueous potassium hydroxide electrolyte (concentration between about 35 and 40 wt. % KOH and 2 wt. % ZnO) was added. The solid porous zinc mass (solid preform) immediately absorbed the alkaline electrolyte and expanded to form the final fresh wet anode 815 as described in the description hereinabove. The cathode composition comprising $MnO_2$ was the same as used in Example 1. The cell had 0.725 grams of zinc. p The wet zinc mass (wet preform) had the following composition:

| The wet zinc mass (wet preform) had the following composition: | |
|---|---|
| | Wet Preform, Wt. % |
| Zinc (with total of 200–500 ppm indium and zero added mercury) | 89.20 |
| Surfactant | |
| Dinonyl phenol phosphate ester surfactant (RM-510) | 0.101 |
| Binders | |
| CARBOPOL C940 binder | 0.978 |
| WATERLOCK A-221 binder | 0.101 |
| Polyvinylalcohol (M.W. 85000 to 146000) | 0.305 |
| Water | 9.32 |
| | 100.00 |

The wet zinc mass is molded into the near shape, though somewhat smaller size of the anode cavity. The molded wet zinc mass (wet preform) is then dried by heating in an oven at about 55° C. for a period of about 2 to 3 hours to evaporate water leaving a solid porous zinc mass (solid preform) having a porosity between about 40 to 50%. The solid porous zinc mass (solid preform) has the following composition:

| Solid Porous Zinc Mass (Solid Preform) | |
| --- | --- |
| | Wt. % |
| Zinc | 98.36 |
| Surfactant | |
| Dinonyl phenol phosphate ester surfactant (RM-510) | 0.112 |
| Binders | |
| CARBOPOL C940 binder | 1.08 |
| WATERLOCK A-221 binder | 0.112 |
| Polyvinylalcohol | 0.336 |
| | 100.00 |

After the solid porous zinc mass (solid preform) is inserted into the anode cavity an aqueous potassium hydroxide electrolyte comprising 38 wt % KOH and about 2 wt % ZnO was added in amount approximately about 0.33 part by weight aqueous electrolyte to 1 part by weight solid preform. The solid preform immediately absorbed the aqueous electrolyte and expanded to fill the anode cavity to form the final fresh anode. The final fresh anode did not have any discernible air pockets therein when the anode was viewed with the aid of X-ray photographs of the cell taken without magnification. The polyvinylalcohol within the final fresh anode helped to hold individual zinc particles in close proximity to one another within a tight network.

Fresh zinc/air button cells of Example 2 were discharged at a constant rate of 8 milliAmp (low rate). In separate tests batches of fresh zinc/air button cells of Example 2 were discharged at a constant rate of 16 milliAmp (high rate).

At discharge of 8 milliAmp, the capacity obtained at a cut off voltage of 0.5 Volts was 530 milliAmp-hrs (731 milliAmp-hrs/g of pure zinc). The average voltage at 50% capacity was 1.17 Volt.

At discharge of 16 milliAmp, the capacity obtained at a cut off voltage of 0.5 Volts was 512 milliAmp-hrs (706 milliAmp-hrs/g of pure zinc). The average voltage at 50% capacity was 1.07 Volt.

A cell gassing test was conducted by measuring the amount of gas generated from the zinc anode when the fresh zinc anode was placed in a sealed bag and stored at 60° C. for 4 weeks. The amount of gassing was 0.014 ml gas per gram of anode.

EXAMPLE 3

Zinc/Air Cell: Anode from Solid Porous Zinc Mass of the Invention/Conventional MnO2 Cathode Test size 675 (11 mm×5 mm) button cells 210 were prepared as in Example 1 except that the anode 815 was formed from the wet zinc mass (wet preform) which was molded into the approximate shape of the anode cavity 255 and then dried to produce the solid porous zinc mass (solid preform) 815C of the invention. The solid porous zinc mass 815C was inserted into the anode cavity 255 and then aqueous potassium hydroxide electrolyte (concentration between about 35 and 40 wt. % KOH and 2 wt. % ZnO) was added. The solid porous zinc mass (solid preform) immediately absorbed the alkaline electrolyte and expanded to form the final wet anode 815 as described in the description hereinabove. The cathode composition comprising MnO$_2$ was the same as used in Example 1. The cell had 0.72 grams of zinc.

The wet zinc mass (wet preform) had the following composition which involved a lower zinc composition than in Example 2:

| | Wet Preform, Wt. % |
| --- | --- |
| Zinc (with total 200–500 ppm indium and zero added mercury) | 88.92 |
| Surfactant | |
| Dinonyl phenol phosphate ester surfactant (RM-510) | 0.054 |
| Binders | |
| CARBOPOL C940 binder | 0.641 |
| WATERLOCK A-221 binder | 0.084 |
| Polyvinylalcohol (M.W. 85000 to 146000) | 0.623 |
| Water | 9.63 |
| | 100.00 |

The wet zinc mass is molded into the near shape, though somewhat smaller size of the anode cavity. The molded wet zinc mass (wet preform) is then dried by heating in an oven at about 55> C. for a period of about 2 to 3 hours to evaporate water leaving a solid porous zinc mass (solid preform) having a porosity between about 40 to 50%. The solid porous zinc mass (solid preform) has the following composition:

| Solid Porous Zinc Mass (Solid Preform) | |
| --- | --- |
| | Wt. % |
| Zinc | 98.42 |
| Surfactant | |
| Dinonyl phenol phosphate ester surfactant (RM-510) | 0.061 |
| Binders | |
| CARBOPOL C940 binder | 0.721 |
| WATERLOCK A-221 binder | 0.095 |
| Polyvinylalcohol | 0.701 |
| | 100.00 |

After the solid porous zinc mass (solid preform) is inserted into the anode cavity an aqueous potassium hydroxide electrolyte comprising 38 wt % KOH and about 2 wt % ZnO was added in amount approximately about 0.33 part by weight aqueous electrolyte to 1 part by weight solid preform. The solid preform immediately absorbed the aqueous electrolyte and expanded to fill the anode cavity to form the final fresh anode. The final fresh anode did not have any discernible air pockets therein when the anode was viewed with the aid of X-ray photographs of the cell taken without magnification. The polyvinylalcohol within the final fresh anode helped to hold individual zinc particles in close proximity to one another within a tight network.

Fresh zinc/air button cells of Example 3 were discharged at a constant rate of 8 and 16 milliAmp.

At discharge of 8 milliAmp, the capacity obtained at a cut off voltage of 0.5 Volts was 527 milliAmp-hrs (726 milliAmp-hrs/g pure zinc). The average voltage at 50% capacity was 1.16 Volt.

At discharge of 16 milliAmp, the capacity obtained at a cut off voltage of 0.5 Volts was 520 milliAmp-hrs (717 milliAmp-hrs/g pure zinc). The average voltage at 50% capacity was 1.06 Volt.

The test results are summarized in the following Tables:

TABLE 1

Performance Comparison Of Size 675 Zinc/Air Button Cells, Discharged at 8 mAmp to Cut Off Voltage of 0.5 V

| | Capacity, mAmp-hrs. | Specific Capacity, mAmp-hrs per gram pure zinc | Average Voltage to 50% Capacity | Anode Gassing[1], ml. gas per gram anode |
|---|---|---|---|---|
| Comparative Cell (Anode Zinc Slurry, Example 1) | 520 | 694 | 1.19 | 0.63 |
| Test Cell (Molded Zinc Anode, Example 2) | 530 | 731 | 1.17 | 0.014 |
| Test Cell (Molded Zinc Anode, Example 3) | 527 | 726 | 1.16 | — |

Notes:
[1]The anode gassing was conducted by measuring the amount of gas generated from the zinc anode when the fresh zinc anode was placed in a sealed bag and stored at 60° C. for 4 weeks.

TABLE 2

Performance Comparison Of Size 675 Zinc/Air Button Cells, Discharged at 16 mAmp to Cut Off Voltage of 0.5 V

| | Capacity, mAmp-hrs. | Specific Capacity, mAmp-hrs per gram pure zinc | Average Voltage to 50% Capacity | Anode Gassing[1], ml. gas per gram anode |
|---|---|---|---|---|
| Comparative Cell (Anode Zinc Slurry, Example 1) | 510 | 681 | 1.10 | 0.63 |
| Test Cell (Molded Zinc Anode, Example 2) | 512 | 706 | 1.07 | 0.014 |
| Test Cell (Molded Zinc Anode, Example 3) | 520 | 717 | 1.06 | — |

Notes:
[1]The anode gassing was conducted by measuring the amount of gas generated from the zinc anode when the fresh zinc anode was placed in a sealed bag and stored at 60° C. for 4 weeks.

As shown from the data reported in the above tables, the overall performance of the zinc/air cells employing the molded zinc anode made by the process of the invention were generally comparable to the same cells employing conventional zinc anode mixture. Gassing tests of fresh molded zinc anode made by the method of the invention appeared to be much less than gassing of fresh zinc anode made by using conventional anode mixture, despite the fact that the anode of the invention did not contain any added mercury.

Although the invention has been described with respect to specific embodiments, it will be appreciated that variations are possible within the concept of the invention. Thus, the invention is not intended to be limited to the specific embodiments herein described, but is defined by the claims and equivalents thereof.

What is claimed is:

1. A method of forming an anode for a zinc/air cell having an anode cavity therein, comprising the step of:
    a) forming a wet mixture comprising zinc particles, a binder comprising polyvinylalcohol and a gelling agent, and water;
    a.1) inserting said wet mixture into a mold cavity;
    a.2) applying pressure to said wet mixture in said mold cavity thereby compacting said wet mixture within said mold cavity;
    a.3) ejecting said compacted wet mixture from said mold cavity thereby producing a molded wet mixture having a molded shape, whereupon said molded wet mixture retains its molded shape;
    b) drying said molded wet mixture to evaporate water therein and thereby producing a dry solid mass comprising said zinc particles, said solid mass retaining its molded shape;
    c) inserting said solid mass into the anode cavity of a zinc/air cell; and
    d) adding an aqueous alkaline electrolyte to the anode cavity whereby said aqueous electrolyte is absorbed by said solid mass, said aqueous electrolyte activates said gelling agent, and thereby forms said anode.

2. The method of claim 1 wherein said solid mass is a solid porous mass comprising zinc particles.

3. The method of claim 2 wherein said solid porous mass expands as said aqueous electrolyte is absorbed therein in step (d).

4. The method of claim 1 wherein said mixture is molded into a designated shape conforming to the shape of said mold cavity prior to drying said mixture.

5. The method of claim 1 wherein the aqueous alkaline electrolyte comprises potassium hydroxide.

6. The method of claim 1 wherein said drying in step b) is effected by heating said wet mixture.

7. The method of claim 1 wherein the polyvinylalcohol has a molecular weight between about 85000 and 146000.

8. The method of claim 1 wherein said binder further comprises a crosslinked acrylic acid polymer gelling agent.

9. The method of claim 1 wherein said binder further comprises a gelling agent comprising a starch graft copolymer of polyacrylic acid and polyacrylamide.

10. The method of claim 1 wherein said mixture prior to drying further comprises indium in total amount between about 200 and 1000 ppm of the zinc.

11. The method of claim 1 wherein said mixture prior to drying further comprises a surfactant.

12. The method of claim 11 wherein said surfactant comprises an organic phosphate ester.

13. The method of claim 2 wherein said solid porous mass has the property that it is storable in ambient air.

14. The method of claim 1 wherein said wet mixture is molded in said mold cavity into the approximate shape of the anode cavity of a zinc/air cell prior to drying said mixture.

15. The method of claim 1 wherein said pressure applied to said wet mixture in step a.2 corresponds to a force of between about 10 and 300 pounds applied by a plunger to said wet mixture in said mold cavity being cylindrical and having a diameter between about 3 and 7 mm, thereby compacting said wet mixture within said mold cavity.

* * * * *